(12) United States Patent
Bernini

(10) Patent No.: US 7,668,631 B2
(45) Date of Patent: Feb. 23, 2010

(54) AUTONOMOUS LAWN MOWER WITH RECHARGE BASE

(76) Inventor: Fabrizio Bernini, Via Della Pace 3, Mercatale Valdarno--Montevarchi, I-52021Bucine (Arezzo) (IT)

(*) Notice: Subject to any disclaimer, the term of this patent is extended or adjusted under 35 U.S.C. 154(b) by 0 days.

(21) Appl. No.: 12/352,882

(22) Filed: Jan. 13, 2009

(65) Prior Publication Data

US 2009/0183478 A1 Jul. 23, 2009

(30) Foreign Application Priority Data

Jan. 23, 2008 (IT) .......................... BO2008A0040

(51) Int. Cl.
*G01C 22/00* (2006.01)
(52) U.S. Cl. ...................... 701/23; 180/168; 56/10.2 F
(58) Field of Classification Search .................. 701/23, 701/25, 207; 700/258; 180/168, 169, 167, 180/274, 279, 275, 277; 56/10.2 A, 10.2 F
See application file for complete search history.

(56) References Cited

U.S. PATENT DOCUMENTS

| | | | |
|---|---|---|---|
| 3,425,197 A | | 2/1969 | Kita |
| 3,550,714 A | * | 12/1970 | Bellinger .................... 180/168 |
| 3,563,327 A | * | 2/1971 | Mier .......................... 180/169 |
| 3,570,227 A | * | 3/1971 | Bellinger ................. 56/10.2 A |
| 3,733,597 A | * | 5/1973 | Healey et al. ............... 340/562 |
| 3,965,442 A | * | 6/1976 | Eaton, Jr. ............... 331/116 FE |
| 4,138,649 A | * | 2/1979 | Schaffer ........................ 330/9 |
| 4,777,785 A | * | 10/1988 | Rafaels ..................... 56/10.2 A |
| 4,964,265 A | * | 10/1990 | Young ........................ 56/10.8 |
| 5,007,234 A | * | 4/1991 | Shurman et al. .......... 56/10.2 R |
| 5,163,273 A | * | 11/1992 | Wojtkowski et al. ......... 56/11.9 |
| 5,323,593 A | * | 6/1994 | Cline et al. ............... 56/10.2 A |
| 5,444,965 A | * | 8/1995 | Colens .................... 56/10.2 A |
| 5,507,137 A | * | 4/1996 | Norris ....................... 56/10.2 J |
| 5,528,888 A | * | 6/1996 | Miyamoto et al. ........ 56/10.2 F |
| 5,572,856 A | * | 11/1996 | Ku .......................... 56/10.2 A |
| 5,911,670 A | * | 6/1999 | Angott et al. ............ 56/10.2 A |
| 5,974,347 A | * | 10/1999 | Nelson ......................... 701/22 |
| 6,443,509 B1 | * | 9/2002 | Levin et al. .................... 293/4 |
| 6,598,692 B2 | * | 7/2003 | Angott ....................... 180/168 |

(Continued)

FOREIGN PATENT DOCUMENTS

DE 200 20 641 U1 5/2002

(Continued)

*Primary Examiner*—Árpád Fábián-Kovács
(74) *Attorney, Agent, or Firm*—Pearne & Gordon LLP

(57) ABSTRACT

An apparatus for cutting grass in a cut area delimited by a perimeter, the perimeter being defined by the presence of regions of grass surface, comprises a lawn-mower and a lawn-mower-recovery base, the lawn-mower comprising a motor unit, a cutting device, the lawn-mower-recovery base being disposed along the perimeter with an accessible aperture allowing the entry of the lawn-mower moving along it, the lawn-mower further comprising a proximity sensor able to detect the presence of a grass surface, a control unit associated with the sensor, the control unit being configured to detect the perimeter, the control unit being configured to determine a condition of alignment of the lawn-mower with the perimeter, the control unit being operatively connected to the motor unit to cause a displacement of the lawn-mower along the same perimeter, to operate the return of the lawn-mower into the lawn-mower-recovery base.

10 Claims, 3 Drawing Sheets

U.S. PATENT DOCUMENTS

| | | |
|---|---|---|
| 6,604,348 B2 * | 8/2003 | Hunt .......................... 56/10.6 |
| 6,611,738 B2 * | 8/2003 | Ruffner ....................... 701/23 |
| 6,984,952 B2 * | 1/2006 | Peless et al. ................ 318/580 |
| 7,185,478 B1 | 3/2007 | Willis, II |
| 2002/0049522 A1 * | 4/2002 | Ruffner ....................... 701/23 |
| 2002/0104300 A1 * | 8/2002 | Hunt .......................... 56/10.6 |
| 2003/0023356 A1 * | 1/2003 | Keable ........................ 701/23 |
| 2005/0007057 A1 | 1/2005 | Peless et al. |
| 2005/0034437 A1 * | 2/2005 | McMurtry et al. ................ 56/1 |
| 2005/0046373 A1 * | 3/2005 | Aldred ...................... 318/580 |
| 2006/0059880 A1 * | 3/2006 | Angott .................... 56/10.2 A |
| 2006/0161318 A1 * | 7/2006 | Aldred et al. ................. 701/23 |
| 2007/0142964 A1 * | 6/2007 | Abramson .................. 700/245 |
| 2008/0007193 A1 * | 1/2008 | Jones et al. ............ 318/568.12 |
| 2008/0039974 A1 * | 2/2008 | Sandin et al. ............... 700/258 |

FOREIGN PATENT DOCUMENTS

| | | |
|---|---|---|
| DE | 10 2007 023 157 A1 | 11/2008 |
| EP | 1612631 A2 * | 1/2006 |
| EP | 1745686 A1 * | 1/2007 |
| FR | 2645700 A1 * | 10/1990 |
| GB | 2 142 447 A | 1/1985 |
| IT | FI2004A000151 A | 1/2006 |
| WO | 00/74465 A1 | 12/2000 |
| WO | WO 02062194 A1 * | 8/2002 |
| WO | WO 2007066195 A2 * | 6/2007 |
| WO | 2008/138967 A1 | 11/2008 |

\* cited by examiner

AUTONOMOUS LAWN MOWER WITH RECHARGE BASE

BACKGROUND OF THE INVENTION

The object of the present invention is a lawn-mower and, in particular, a self-propelled lawn-mower for maintaining a defined cut area. Presently, self-propelled lawn-mowers are known which operate within a cut area defined by the perimetric wire which interacts electro-magnetically with a suitable circuit provided on the lawn-mower for determining an internal/external position thereof with respect to the cut area.

Systems are also known which make it possible for the lawn-mower to return autonomously to a recharge base to carry out the electric recharge.

The re-entry into the base is determined by a control unit which executes an electronic program to operate the displacements of the lawn-mower.

The systems of known type exhibit the drawbacks of a relative complexity both for the presence of a perimetric wire and the need for processing an electromagnetic signal.

The object of the present invention is to overcome the said drawbacks by providing a self-propelled lawn-mower of simple construction and able to operate within a predetermined cut area.

A further object is to provide an apparatus and a lawn-mower allowing the latter to re-enter into a recharge base in a simple and reliable manner.

These and other object, which will appear more clearly by a reading of the detailed description that follows, are achieved, according to the present invention, by means of a lawn-mower and an apparatus as disclosed in the attached main claims. Further embodiments of the same invention being set forth in the corresponding dependent claims.

BRIEF DESCRIPTION OF THE DRAWINGS

The invention is illustrated herebelow in greater detail with reference to the accompanying drawings which represent an exemplary and non-limiting embodiment thereof. In the drawings.

DETAILED DESCRIPTION

Figure 1:
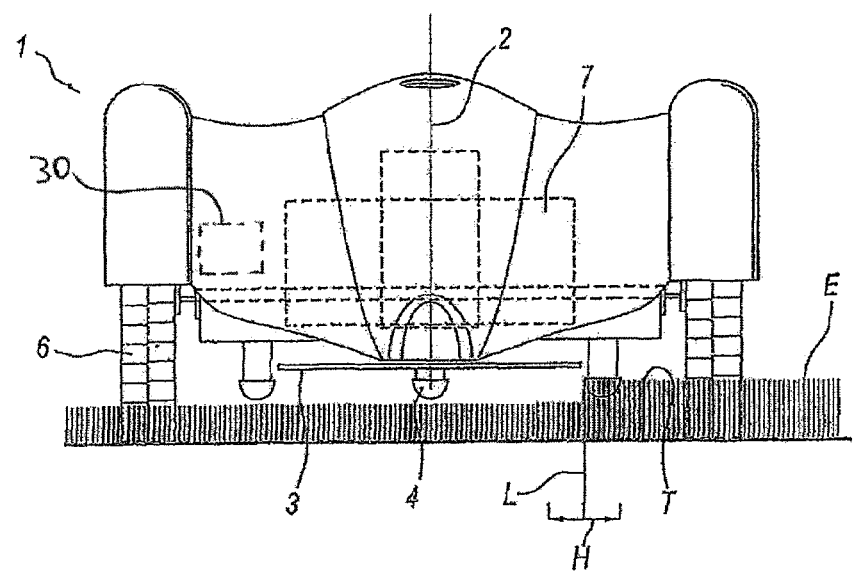
FIG. 1 is a front view of a lawn-mower according to the invention.
Figure 2:
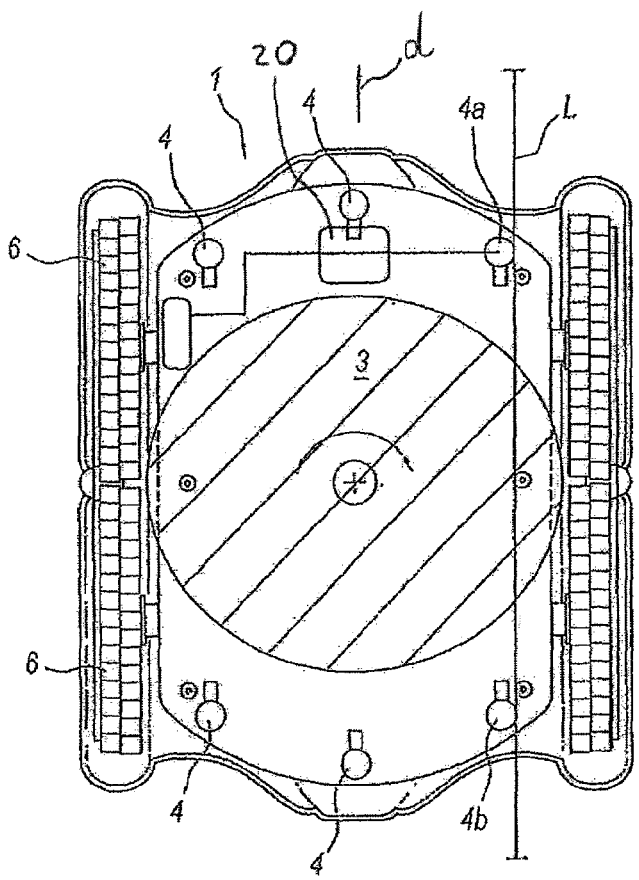
FIG. 2 is a top view of the lawn-mower of FIG. 1.

Described herebelow with reference to FIGS. 1 and 2 is a lawn-mower 1, according to the invention, provided with a motor unit 2 powered by an electric battery 30 to actuate a cutting blade 3 connected to the motor unit 2 and disposed below the lawn-mower, and with a motor unit 7 powered by an electric battery 30, possibly coinciding with the motor unit 2, to drive into motion four wheels 6 connected to the motor unit 7 and disposed in pairs for moving the lawn-mower.

The motor units 2, 7, the mechanic components for operating the blade 3, and the mechanic components for moving the lawn-mower's wheels 6, do not make part of the invention and will not therefore be described herein in detail.

Within the scope of the present invention, it is specified, by way of example, that providing the lawn-mower's direction of displacement, could be formed by the wheels' steering mechanism, or, in case of non-steering wheels, by a differentiated control for the wheels' rotation speed provided at the sides of the lawn-mower.

Shown in FIG. 1 are sensors 4 predisposed for detecting the presence of a border line L of a cut area A, located at a distance H from the sensor, as preset in the lawn-mower's control unit 20 and schematically represented in FIG. 2.

On the basis of the signal received from the sensor, the control unit is able to determine a condition of proximity of the sensor to the line L.

In particular, according to the invention, at least two sensors 4 are provided (six, in the example being shown) allowing to define a condition of alignment of the lawn-mower with the line L.

In practice, the occurrence at the same time of a condition of proximity of two sensors 4 to the line L, makes it possible to establish an alignment of the lawn-mower.

Advantageously, once the alignment condition of the two sensors 4a, 4b in the longitudinal direction "d" of the lawn-mower (FIG. 2) has been established, the control unit can give the command for the actuation of the wheels to move the lawn-mower in a direction allowing to keep its alignment with the line L.

Figure 3:
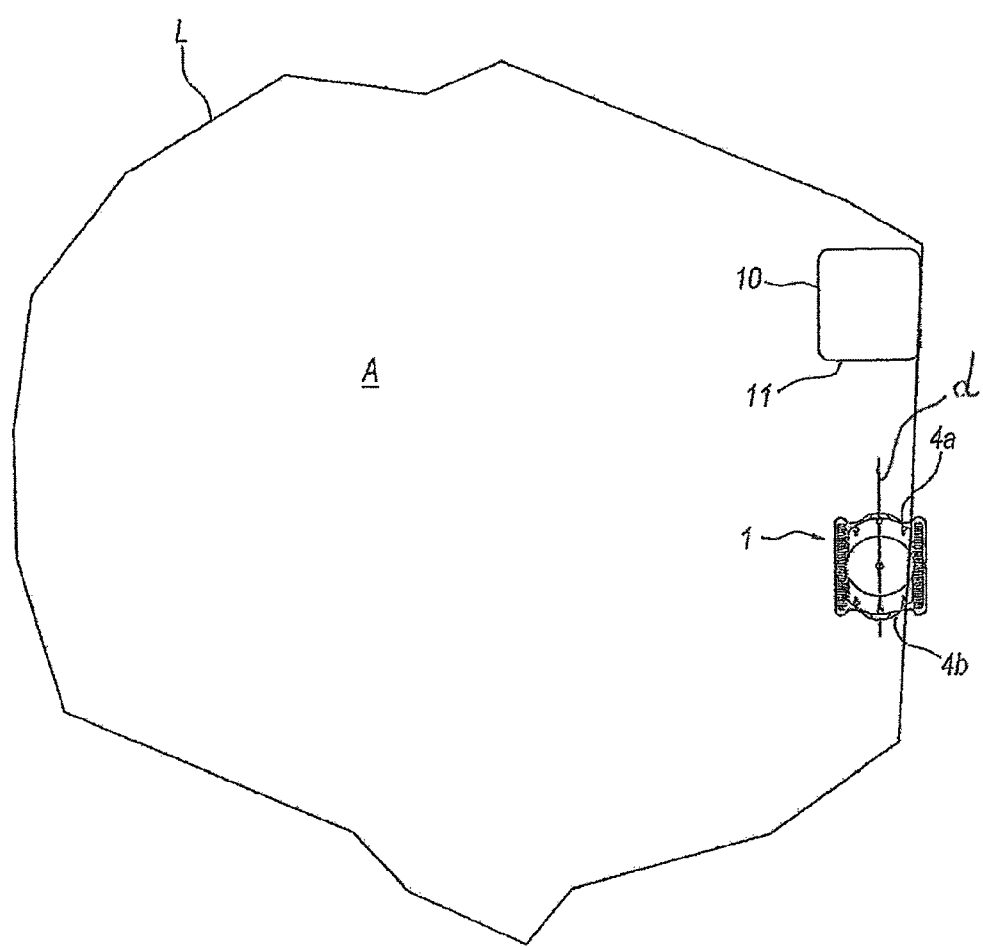
FIG. 3 is a top view of a cut area with a cutting device according to the invention.

This solution makes it possible, for example, to operate the return of the lawn-mower into a recharge base 10, the latter being preferably provided with a bottom 17 and with at least a partial cover 18 to be connected along the line L (either outside or inside the area A) to at least one aperture 11 located in the direction of the lawn-mower motion so as to allow the automatic entry thereof into the base (FIG. 3).

Preferably, the base 10 and the lawn-mower 1 are provided with respective connections in order to automatically establish an electric contact upon the entry of the lawn-mower into the base 10. For example, the recharge can occur by means of an inductive coupling via a low-voltage line, or in another suitable manner.

Figure 4:
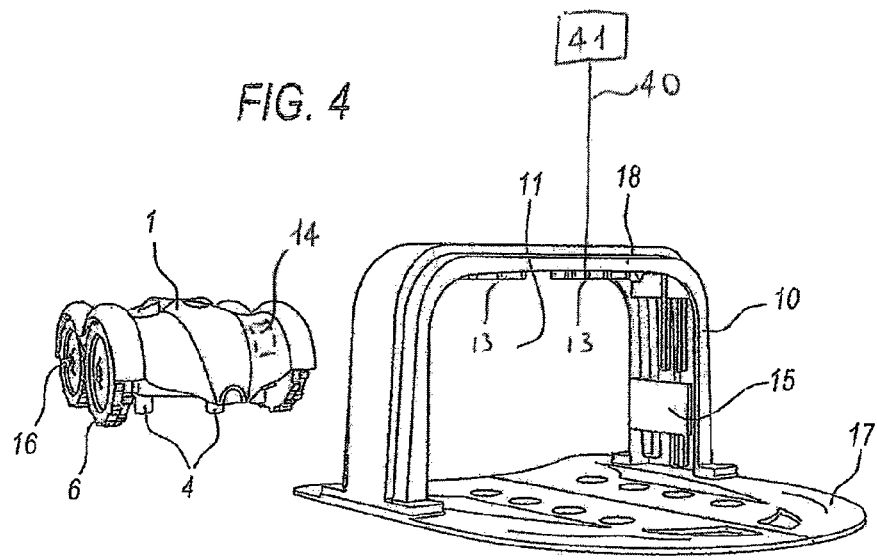
FIGS. 4 and 5 show a detail of the lawn-mower and relative recharge base in a first embodiment of the recharge system, with the lawn-mower respectively in a position outside the base and inside thereof in front view.

By way of example FIG. 4 shows a system for an automatic recharge in which the base 10 is provided with an inductive recharge device 13 which is in turn connected to the outlet of an external power supply 41 and able to induce without contact a current to an electric connection 14 located inside the lawn-mower. Advantageously, the power supply 41 can be preferably provided with a plug/outlet coupling 40 of inductive and low voltage type (at 12-24 V, for example) to avoid any contact between metal parts and the supply mains in the presence of humidity or water.

Figure 5:
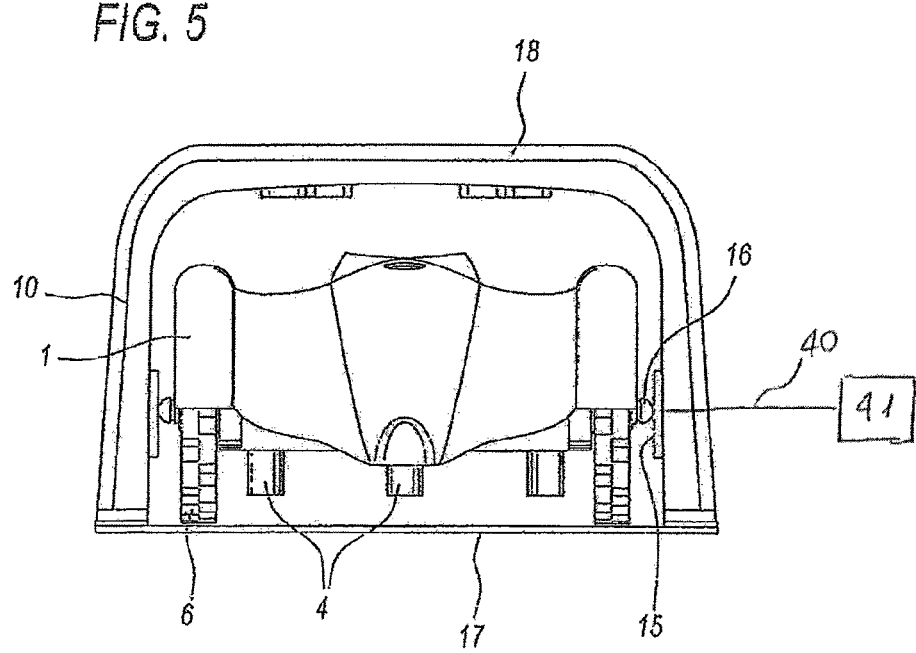

In the example of FIG. 5, the system provides for a contact between electrically supplied recharge springs 15 which make contact with recharge knobs 16 connected to the battery 30 of the robot/lawn-mower.

By way of example, the direction of displacement of the lawn-mower can be determined by the control unit by discriminating the upstream and downstream position of sensors 4a, 4b with respect to the lawn-mower.

In a possible operation mode, when the lawn-mower moves close to the line L, a sensor 4, for example 4a, will be the first to be in proximity condition.

At this point, the control unit can start the motor unit associated with the wheels to make the latter move the lawn-mower until a proximity condition of sensor 4b takes place as well and the alignment of the lawn-mower with the line L is obtained.

Similarly, the occurrence of the proximity condition of further pairs of sensors can be used for establishing the position and orientation of the lawn-mower with respect to the line L.

In a preferred embodiment of the invention, the line L is defined by the presence of regions of grass surface E having height lower or greater than a preset value T, and the sensors 4 are presence sensors able to detect the presence, if any, of a grass surface within the distance H.

By way of example, a sensor 4 suited to the purpose is an electronic proximity sensor able to sense the perturbation induced in a surrounding volume by an object and to translate this perturbation into an electric signal.

In the case herein considered, the mass is that of a grass surface above the height T.

Such a sensor includes, in particular, a detecting terminal component, for example a wire or metal sheet connected to an electric circuit or to an electronic device able to transfer, and possibly amplifying, a signal fed to the terminal, thereby having the function of aerial for the presence sensor 4.

The detecting terminal is then connected to MOS junction components (metal-oxide-semiconductor) of parasitic effect by which it is possible to cause an interaction with the electric behaviour of the same components by exclusively perturbating the volume of air in proximity of sensor 4.

Advantageously, the sensor 4 may comprise an oscillator with a gate of an inverting Schmitt circuit, or any device comprising at least one component made by the metal-oxide-semiconductor junction technology and capable of giving, in response to variations of an input signal, an output electric oscillation.

A description of this preferred embodiment is disclosed in the Patent Application No. FI2005A000250.

It is understood, however, that the sensors 4 can be of mechanical contact type, of optical, chromatic, radio, capacitive, inductive, ultrasound type or other, provided that it is able to recognize the existence of a border line L and to signal to the control unit a condition of proximity to the same line.

By way of example, the line L can be defined, fully or partly, by an orientation wire located on the ground and, in this case, as the robot moves onto the wire, the sensor 4—which may be the same or other than the one above described for the recognition of the grass surface—allows the control unit to track the same wire as far as to meet the recharge base.

In this case, provision could be made also of systems for the detection of a perimetric electric wire, of a type known per se, which exploit the electromagnetic effects generated by a current applied along the perimetric wire, for example by detecting the intensity of the magnetic field generated by the current.

A system particularly suitable for the purpose is disclosed in the Patent Application FI2004A000151 which provides for feeding a wire with an electric control signal of sinusoid type in order to generate a magnetic field, and measuring the phase difference between a detected electric signal, which depends on the magnetic field, and a reference electric signal.

A second embodiment of a lawn-mower 1, according to the present invention, comprises a motor unit 2 for the directional displacement of same lawn-mower 1, a cutting device 3, means 4 for detecting a perimeter L of a cut area A, and means for detecting a condition of proximity of the lawn-mower 1 with respect to the perimeter L.

The lawn-mower 1 further comprise a control unit 20 operatively associated with the proximity-condition detecting means for receiving a signal therefrom representative of the condition of proximity to the perimeter L.

The control unit is operatively connected to the motor unit 2 to cause a displacement of the lawn-mower 1 over a predetermined trajectory, with respect to the same perimeter L, in response to a received proximity signal.

In particular, the predetermined trajectory to be followed by the lawn-mower 1 in response to the detection of perimeter L, can advantageously formed by arcs of a circle.

In particular, when the sensors 4 detect a proximity to the line L, instead of determining the alignment of the lawn-mower 1 with said line, drive the lawn-mower into motion so as to reverse its direction of advancement with respect to the line L.

More specifically, in this embodiment, the lawn-mower 1 does not follow the line L, but every time it detects the line, bounces over it until it finds the recharge base 10.

A further embodiment of the present invention provides for a guide device disposed in proximity of the base 10, for example an electric wire, which simulates a signal read by the lawn-mower as the presence of grass and, therefore, directs univocally the lawn-mower 1 into the recharge base 10.

By way of example, the guide device may comprise an electric wire disposed so as to exit from the recharge base and extending a few meters away therefrom.

In this way, as soon as the lawn-mower detects the presence of said wire, it is automatically guided into the base.

This embodiment is particularly advantageous when the recharge base 10 is located on an area in which the grass is hardly dense, or when the base is disposed outside the cut area T.

The advantages achieved by the invention lie essentially in the possibility of driving a self-propelled lawn-mower along a border line of the cut area, and this even when the border line is a spontaneous perimeter (such as the end of a grass surface of a garden) and when a border is artificially defined by laying down a perimetric wire.

Moreover, the invention allows positioning a lawn-mower's recovery and/or recharge base with respect to the line L and causing the same lawn-mower to re-enter the base by following the line L.

The invention thus conceived is evidently suited for industrial application; the same invention can also be subjected to several modifications and changes falling within the scope of the inventive idea; moreover, all the parts may be replaced by other elements technically equivalent.

The invention claimed is:

1. Apparatus for cutting grass in a cut area delimited by a perimeter, said perimeter being defined by the presence of regions of grass surface having height lower or greater than a preset value, said apparatus comprising a lawn-mower and a lawn-mower-recovery base, said lawn-mower comprising:
a motor unit for the directional displacement of said lawn-mower,
a cutting device,
said lawn-mower-recovery base being disposed along said perimeter of the cut area with an accessible aperture allowing the entry of the lawn-mower moving along said perimeter,
said lawn mower further comprising
at least a first proximity sensor able to detect the presence, if any, of a grass surface exceeding said height;
a control unit operatively associated with said first proximity sensor for receiving a signal therefrom, said control unit being configured to detect said perimeter according to said signal, said control unit being configured to determine a condition of alignment of said lawn-mower with said perimeter according to said signal,
said control unit being operatively connected to said motor unit to cause a displacement of the lawn-mower along said perimeter in response to the alignment condition to operate the return of said lawn-mower into the lawn-mower-recovery base.

2. Apparatus according to claim 1, wherein said lawn-mower comprises means for causing the lawn-mower to move in a preset direction of displacement along said perimeter.

3. Apparatus according to claim 1, wherein said lawn mower further comprises a second proximity sensor, said control unit being configured to operate said motor unit for keeping both sensors in proximity of the perimeter.

4. Apparatus according to claim 1, wherein said lawn-mower is a self-propelled, battery-rechargeable lawn-mower, and said lawn mower recovery-base is a recharge base provided with an electric connection to a power supply, and wherein said lawn mower recovery-base and said lawn-mower are provided with respective electric connections to establish an electric connection between said power supply and said lawn-mower and to carry out a recharge of batteries.

5. Apparatus according to claim 4, wherein said respective connections are preset for establishing said electric connection between the power supply and said lawn-mower in an automatic mode upon the entry of the lawn-mower into the lawn mower recovery-base.

6. Apparatus according to claim 4, wherein said respective connections are of inductive coupling type.

7. Apparatus according to claim 2, wherein said means for causing the lawn-mower to move in a preset direction comprise said control unit associated with wheels, said control unit being capable of giving command for the actuation of said wheels to move said lawn-mower in a direction allowing to keep its alignment with the perimeter.

8. Apparatus according to claim 3, wherein said control unit is capable of discriminating the upstream and downstream position of said sensors with respect to said lawn-mower.

9. Apparatus according to claim 8, wherein said control unit is configured to
   detect that the first proximity sensor is in the proximity condition of the perimeter,
   start said motor unit associated with wheels to make the latter to move said lawn-mower until a proximity condition of said second proximity sensor takes place as well and the alignment of said lawn-mower with said perimeter is obtained.

10. Apparatus according to claim 2, wherein said lawn mower further comprises a second proximity sensor, said control unit being configured to operate said motor unit for keeping both sensors in proximity of the perimeter.

* * * * *